(12) United States Patent
Seidl

(10) Patent No.: US 6,869,524 B1
(45) Date of Patent: Mar. 22, 2005

(54) SCRAPER ARM FOR RAKE SCREEN

(75) Inventor: Gerald Seidl, Houston, TX (US)

(73) Assignee: Headworks, Inc., Houston, TX (US)

( * ) Notice: Subject to any disclaimer, the term of this patent is extended or adjusted under 35 U.S.C. 154(b) by 167 days.

(21) Appl. No.: 10/271,059

(22) Filed: Oct. 15, 2002

Related U.S. Application Data
(60) Provisional application No. 60/328,984, filed on Oct. 12, 2001.

(51) Int. Cl.[7] .............................................. B01D 29/64
(52) U.S. Cl. ......................... 210/159; 210/162; 210/407
(58) Field of Search ................................ 210/158, 159, 210/162, 407, 408, 413

(56) References Cited

U.S. PATENT DOCUMENTS

| | | | | |
|---|---|---|---|---|
| 1,912,020 A | * | 5/1933 | Steindorf | 210/162 |
| 2,128,347 A | * | 8/1938 | Briggs | 210/159 |
| 2,291,103 A | * | 7/1942 | Plummer | 210/159 |
| 2,978,105 A | * | 4/1961 | Poheim | 210/159 |
| 3,144,406 A | * | 8/1964 | Crise | 210/159 |
| 4,709,804 A | * | 12/1987 | Duperon | 210/413 |
| 5,565,093 A | | 10/1996 | Frankenberger | |
| 5,730,862 A | | 3/1998 | Mahr | |
| 6,309,540 B1 | * | 10/2001 | Chang | 210/159 |

FOREIGN PATENT DOCUMENTS

| | | |
|---|---|---|
| GB | 1373342 | 11/1974 |
| GB | 1525871 | 9/1978 |
| GB | 1598103 | 9/1981 |
| GB | 1598130 | 9/1981 |
| GB | 2170422 | 8/1986 |
| GB | 2275622 | 9/1994 |
| GB | 2350070 | 11/2000 |
| WO | 95/32044 | 11/1995 |

* cited by examiner

*Primary Examiner*—Christopher Upton
(74) *Attorney, Agent, or Firm*—Bracwell & Patterson, L.L.P.

(57) ABSTRACT

A screen system used in fluid channels has a scraper for removing debris from bars in a bar screenfield. The scraper is mounted to a top of a screen system. The scraper is lifted by a rake while simultaneously removing debris from the rake. Once the rake clears the scraper, the scraper returns to an original position. The scraper has arms that have wear plates with curvatures selected to avoid contact with the teeth. The scraper can have a cushioning device to lessen the impact of the scraper as it returns to a rest position.

19 Claims, 7 Drawing Sheets

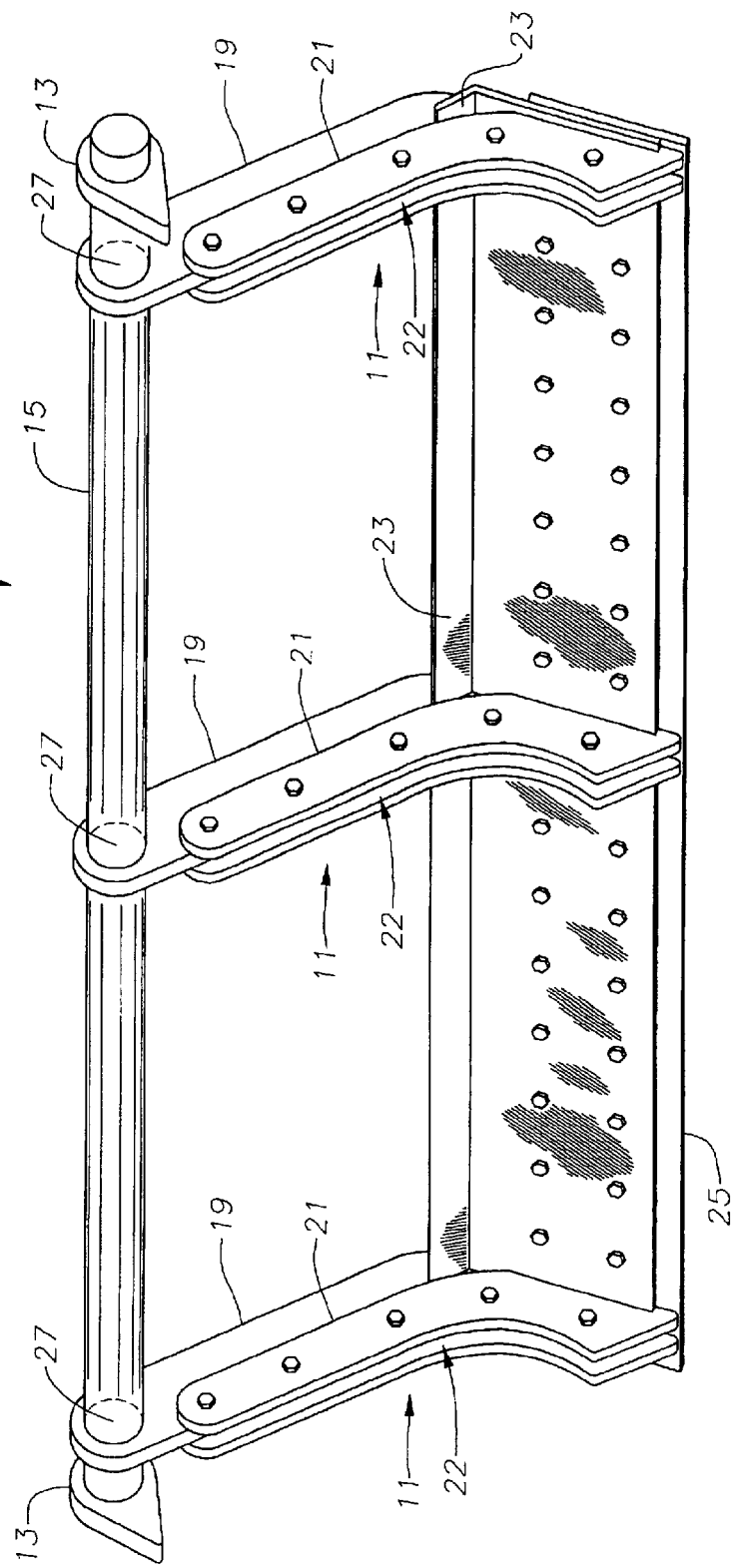

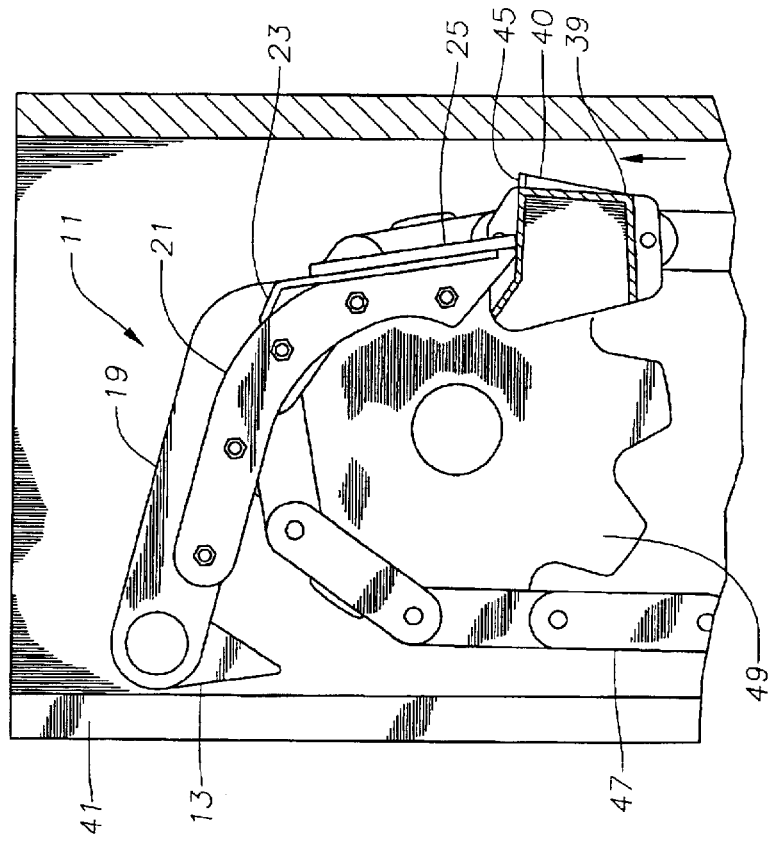
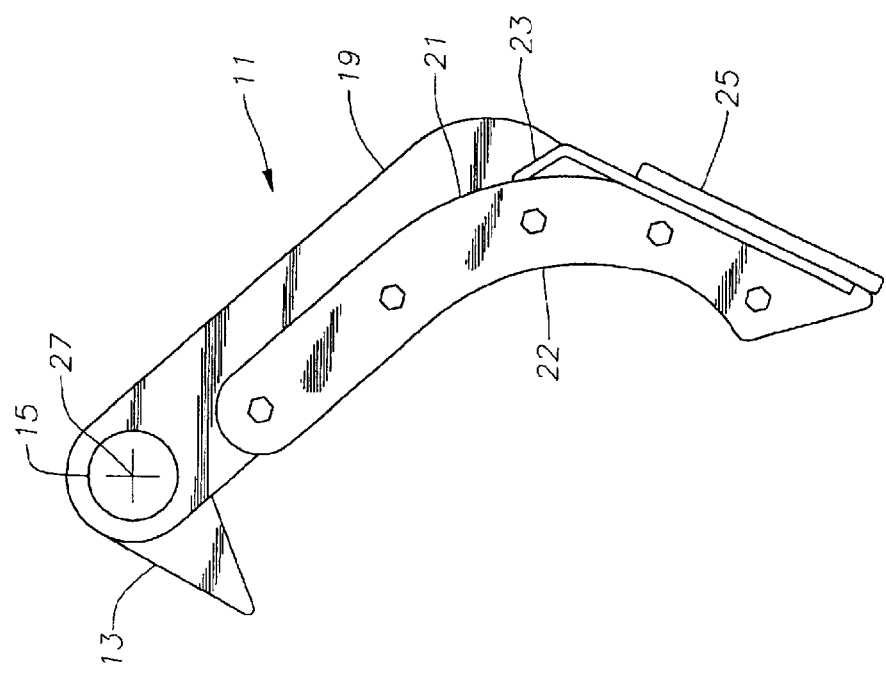

US 6,869,524 B1

SCRAPER ARM FOR RAKE SCREEN

RELATED APPLICATIONS

This application claims the benefit of a provisional application having U.S. Ser. No. 60/328,984, filed on Oct. 12, 2001, which hereby is incorporated by reference in its entirety.

BACKGROUND OF THE INVENTION

1. Technical Field of the Invention

The present invention relates to rake device scraper arms for cleaning screens and perforated screens located in water conduits such as waste water treatment streams, power plants, sewers, and cooling water streams. More particularly, this invention relates to an improved scraper arm to hold a scraper to remove debris from the rake screen or perforated screen without wearing out the rake bar or screen elements.

2. Background of the Prior Art

Bar screens are used for screening solids and debris from flowing liquid streams. An example of such a bar screen system can be found in U.S. Pat. No. 5,730,862 issued to Mahr. In such systems, a series of rakes pass over parallel screen bars, which make up a bar screenfield and remove the debris collected from the flowing stream. Occasionally, large pieces of debris can plug the teeth on the rakes, causing the performance of the rakes to deteriorate. If the rakes do not perform properly, the bars within the bar screenfield can become plugged and eventually cause the water to overflow over the filter system. When this excessive pluggage occurs, the screen system must be cleaned by typically taking the screen system out of service for a relatively long period of time in order to clean the rakes.

Others have attempted to solve the problem of pluggage in the rakes by using such devices as brushes and scrapers to remove debris from the rakes. Brushes get clogged and do not operate very well after a short time period. Others have used scrapers to remove the debris from the rakes. Great Britain Pat. No. GB 1,525,871 issued to Crosby illustrates one example of a scraper. Weaknesses exist in prior scrapers due to the metal-to-metal contact between the scraper and the rake teeth. This metal-to-metal contact causes the scraper to wear out quickly, requiring replacement of the scraper assembly relatively fast.

A need exists for a way of cleaning the rakes within a bar screen system that can be performed quickly, safely, and cost effectively. A need also exists for the cleaning method to be reliable and be able to be used for an extended period of time. Ideally, such a system should be capable of being adapted to the specific fluid applications and also be able to be used on existing screen system equipment with minimal modification.

SUMMARY OF THE INVENTION

The present invention advantageously provides a screen system for removing debris from a flow channel. The screen system includes a screen frame having a bar screenfield that is located below a debris plate. The bar screenfield includes a plurality of bars. Rakes with a plurality of tines, or teeth, fit between the bars of the bar screenfield. The rakes are movable along the bar screenfield to clear the bar screenfield of debris. The screen system also includes a scraper mounted at the top of the screen system.

The scraper removes debris off of the rakes when the rakes reach the top of the screen system. Each rake raises the scraper as the rake reaches the top of the screen system while the scraper removes, or scrapes, the debris off of the rake. Once the scraper clears the rake, the scraper returns to an original position. The scraper contains a plurality of scraper arms that hold a scraper support plate attached to a scraper blade. At least some of the scraper arms have a set of wear guides. A curvature in front edges of the wear guides prevents metal tines, or teeth, in the rake from being worn down since the physical contact between the metal tines and the metal base arm is nonexistent.

BRIEF DESCRIPTION OF THE DRAWINGS

So that the manner in which the features, advantages and objects of the invention, as well as others which will become apparent, may be understood in more, detail, more particular description of the invention briefly summarized above may be had by reference to the embodiment thereof that is illustrated in the appended drawings, which form a part of this specification. It is to be noted, however, that the drawings illustrate only a preferred embodiment of the invention and are therefore not to be considered limiting of the invention's scope as they may admit to other equally effective embodiments.

FIG. 3 is a perspective view of a scraper of the screen system of FIG. 1 in accordance with the present invention;

FIG. 4 is a side view of the scraper of FIG. 3 in accordance with the present invention;

FIG. 5 is an enlarged sectional view of the screen system of FIG. 4, showing the scraper after initially being raised by the rake, in accordance with the present invention;

DETAILED DESCRIPTION OF THE DRAWINGS

Figure 1:
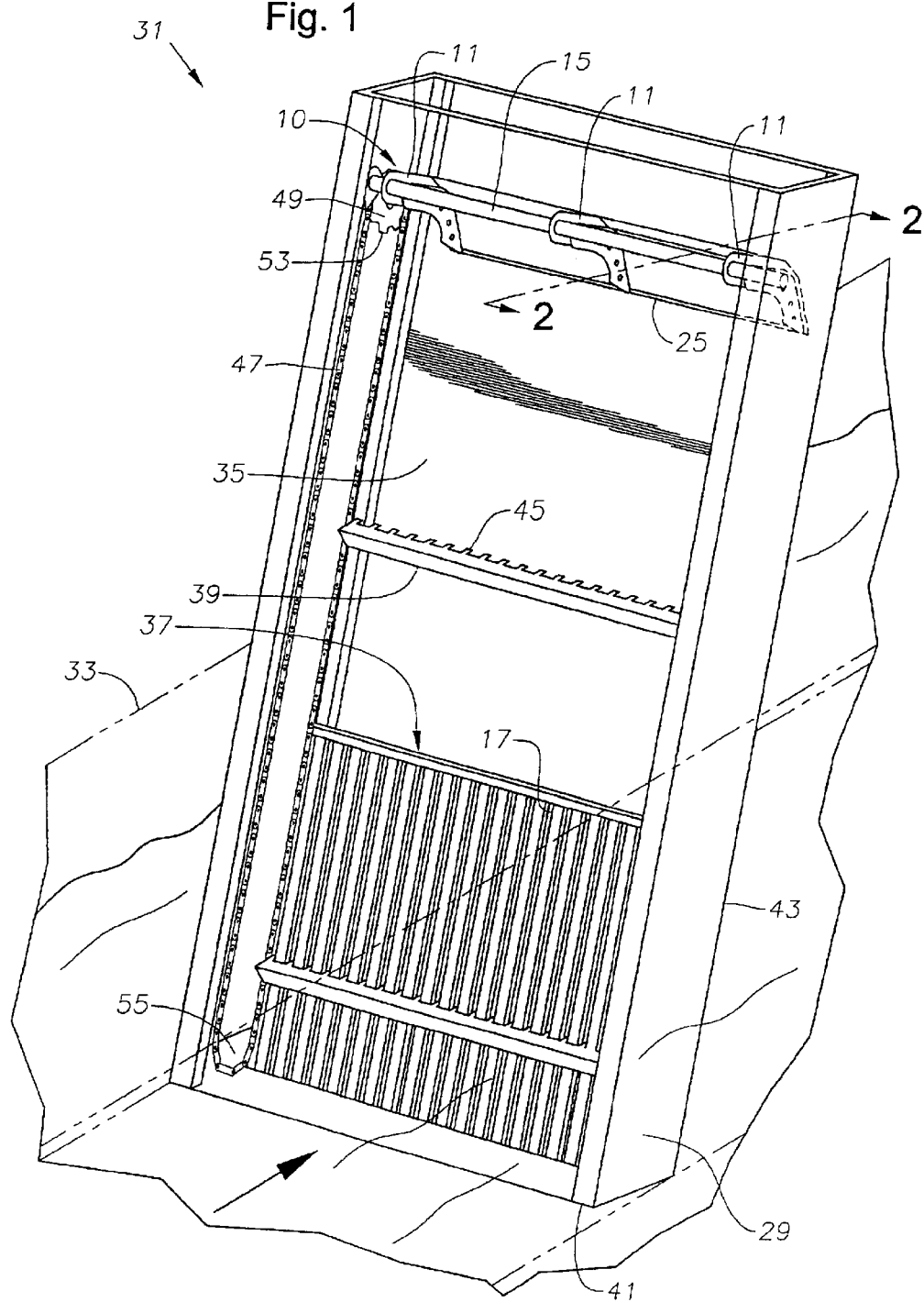
FIG. 1 is a perspective view of the screen system of the invention disposed in a liquid flow stream in accordance with the present invention.
Figure 2:
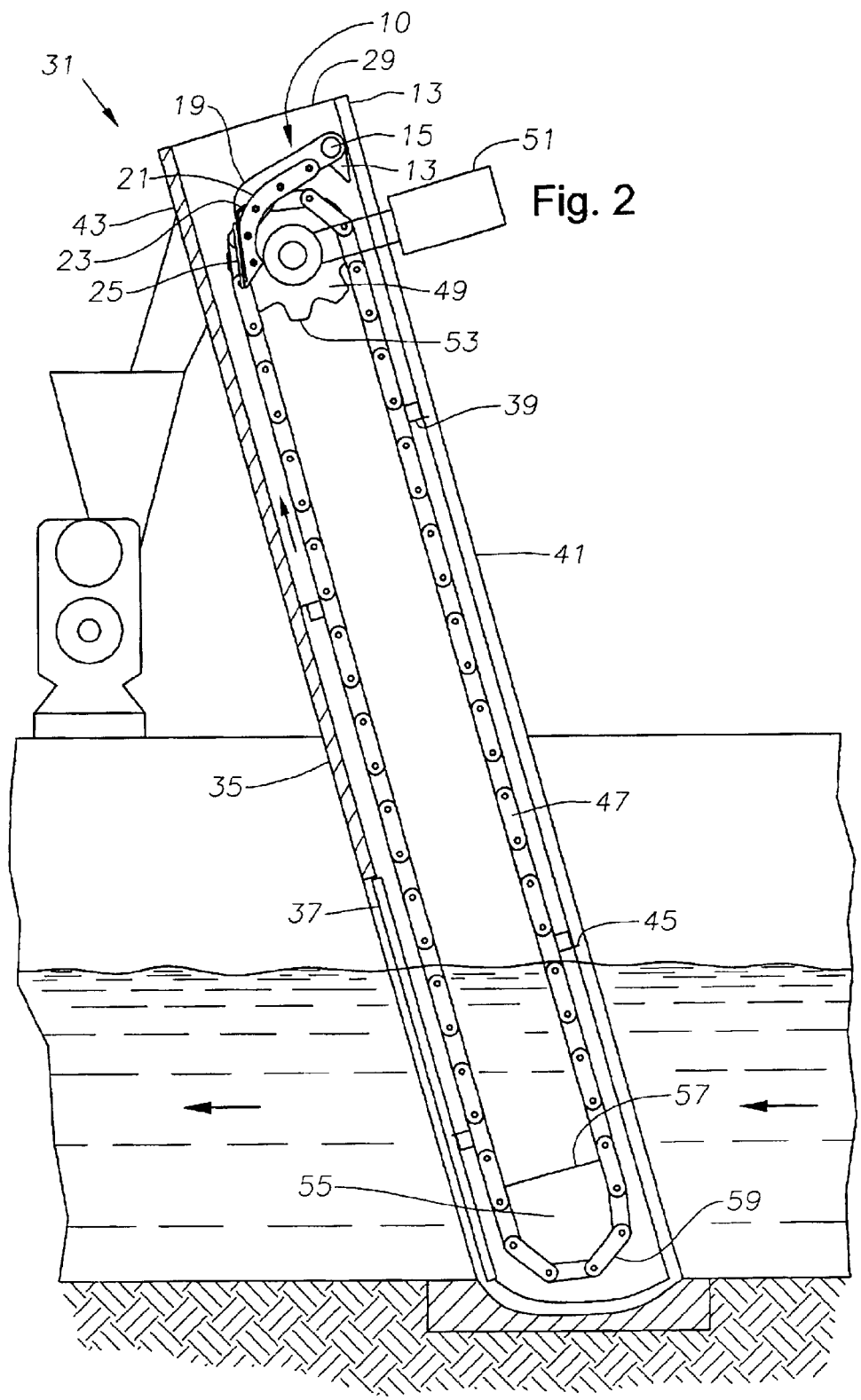
FIG. 2 is a sectional view of the screen system of FIG. 1 taken along the line 2—2 of FIG. 1 in accordance with the present invention.

A screen system 31 is shown in FIGS. 1 and 2 installed in a channel 33 through which a liquid flow stream passes in the direction indicated by the arrow. This screen system 31 generally comprises a screen frame 29, a debris plate 35 for preventing debris from spilling over screen system 31, a screen 37 for collecting solid waste in the flow stream, and a series of rakes 39 for removing solids and debris from bar screen 37 or perforated screen.

Screen frame 29 has a front edge 41 and a rear edge 43. When screen system 31 is installed in a channel 33, screen frame front edge 41 will be on the upstream side, and screen frame rear edge 43 will be on the downstream side. The distance between screen frame front edge 41 and screen frame rear edge 43 defines the depth dimension of screen frame 29. Bar screen 37 and debris plate 35 are attached to screen frame rear edge 43, with bar screen 37 located immediately below debris plate 35.

Bar screen 37 comprises a set of parallel, evenly spaced, vertical bars 17. The preferred embodiment of the screen system uses flat bars 17, which are trapezoidal in cross-section. However, the bars 17 can be constructed in various shapes. The leading edge of each bar in the preferred embodiment is wider than the trailing edge, to prevent debris from obstructing the screen. The bars 17 are spaced to allow liquid to pass unimpeded, but to block the passage of any debris or solids in the flow stream. Screen 37 contains enough bars 17 to extend across the entire width of screen frame 29. These solids and debris accumulate on the front of bar screen 37.

For illustrative purposes, in the preferred embodiment of the rake system, each rake 39 has a series of castellations or tines 45 to fit in the gaps between each bar 17. The shape of the tines 45 can vary depending upon the size of the gaps between each bar 17. Rakes 39 are attached at each end to endless chains 47. The two chains 47 carry rakes 39 in an upward direction over the front surface of bar screen 37. As each rake 39 travels upward along bar screen 37, tines 45 clean the accumulated solids and debris from bar screen 37. Solids and debris are carried to the top of screen system 31 for disposal.

As shown in FIG. 2, each endless chain 47 travels about a sprocket 49 near the top of screen frame 29. To accommodate the pair of chains 47, one sprocket 49 is located on the left side of screen frame 29 and one on the right side. A motor 51 drives both sprockets 49, ensuring that both chains 47 travel at the same velocity. Referring again to FIG. 2, each sprocket 49 has teeth 53 that engage the links of chain 47. The primary function of teeth 53 is to drive the chain 47; however, teeth 53 also maintain the mobility of chain 47 by dislodging any debris that may have accumulated between chain links.

A scraper 10 is mounted at the top of a rake screen system 31, as illustrated in FIGS. 1 and 2. Scraper 10 is mounted to the top of frame 29 for scraping debris from the rake bars 17 as they are moved past. The debris falls down a trough and is carried away for disposal.

Figure 7:
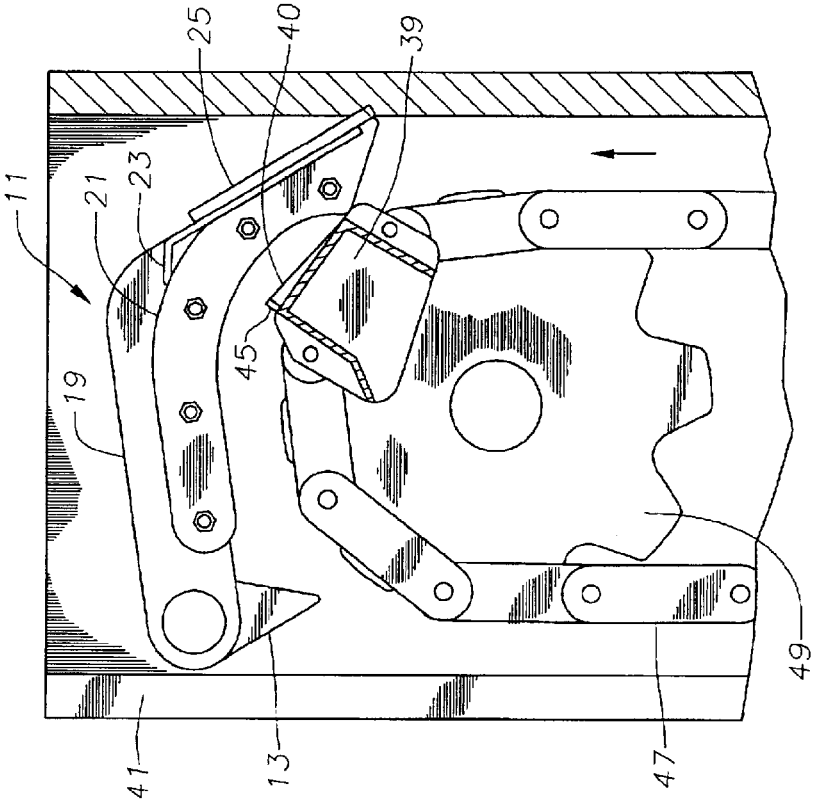
FIG. 7 is a side view of the screen system as shown in FIG. 6, but after the rake screen has cleared the scraper arm, in accordance with the present invention.

The improved scraper 10 is shown in a three bar variation with a scraper blade 25 attached to the scraper arms 11. The scraper 10 is pivotally attached to the frame 29 of the screen system by a shaft 15 with a stop plate 13 at each end of the shaft 15, which limits the rotation of the scraper blade 25. The stop plates 13 rotate with shaft 15 and scraper arms 11 and contact a flange on the forward side 41 of frame 29 to stop the downward movement as shown in FIG. 7. The scraper arm assembly 10 fits between the two sprockets 49. Scraper 10 can have more scraper arms 11 depending upon the length of the entire screen. The location of the scraper arms 11 can be varied along the shaft.

FIG. 4 depicts a detailed side view of one of the scraper arms 11. Scraper arm 11 includes a base arm 19, a set of plastic wear guides 21, and a scraper support plate 23 that is attached to an ultra-high molecular weight (UHMW) plastic scraper blade 25. One suitable plastic for the wear guides 21 is an UHMW plastic. Other suitable plastics for wear guides 21 will be known to those skilled in the art and are to be considered within the scope of the present invention. Base arm 19 is recessed back from the edge of wear guide 11, so there is no contact with the tines 45. Base arm 19 is a thin L-shaped member having a flat back and bottom with a radius between the two and is typically made of metal. A front edge of the base arm 19 is concave shaped and can be made with various pitches and/or angles. Shaft 15 extends through a hole in the upper end of each base arm 19. Each base arm 19 is rigidly mounted to shaft 15, typically by welding. When only two scraper arms 11 are installed, the bar screenfield can be configured with a clearance on each side of the bar screenfield to enable the rakes 39 to fit between the scraper arms 11 entirely. Tines 45 would not touch rakes tines 45, if so.

Wear guides 21 are thin plates. The front and back edges of the wear guides 21 are curved with the curved front edges 22 being slightly forward of the base arm 19. The wear guides 21 are bolted to the base arm 19, with one wear guide 21 on each side of the base arm 19 with the base arm 19 between the wear guides 21, as shown in FIG. 3. The wear guides 21 are shorter than the base arms 19 and are attached so that their front edges slightly protrude past the front edge of the base arm 19. The bottom edges of the wear guides 21 are slightly recessed above the bottom edge of the base arm 19.

Support plate 23 is a flat plate extending the width of the scraper 10. The support plate 23 is connected to the base arms 39, typically by welding, just below where the wear guides 21 sit. FIG. 3 depicts a scraper 10 with three scraper arms 11. When more than two scraper arms 11 are used, the middle arms do not require the use of the wear guides 21. However, the wear guides 21 can be installed on the middle arm, as shown in FIG. 3. The length of the scraper support plate 23 can vary, depending upon the length of the scraper blade 25 needed. The length of the scraper blade 25 is the same as the length of the rake bars 17 and shorter than the distance between sprockets 49. The scraper blade 25 is connected to the support plate 23 with bolts, fasteners, or other similar means. The scraper blade 25 lies behind the support plate 23 and protrudes slightly past the front edge of the support plate 23 and the base arm 19, flush with the edge of the wear guides 21.

Wing bars 40 are attached in pairs to the top edge of the tines 45 and the rake 39 at about a 45° angle and are parallel to each other. Wing bars 40 are constructed of metal bars. Wing bars 40 are only installed behind the two contact tines 45 for each scraper arm 11. The width of wing bars 40 is no thicker than the width of tines 45. Wing bars 40 prevent rake bar 17 from catching on scraper 10 in the event the rotational direction reverses.

Figure 6:
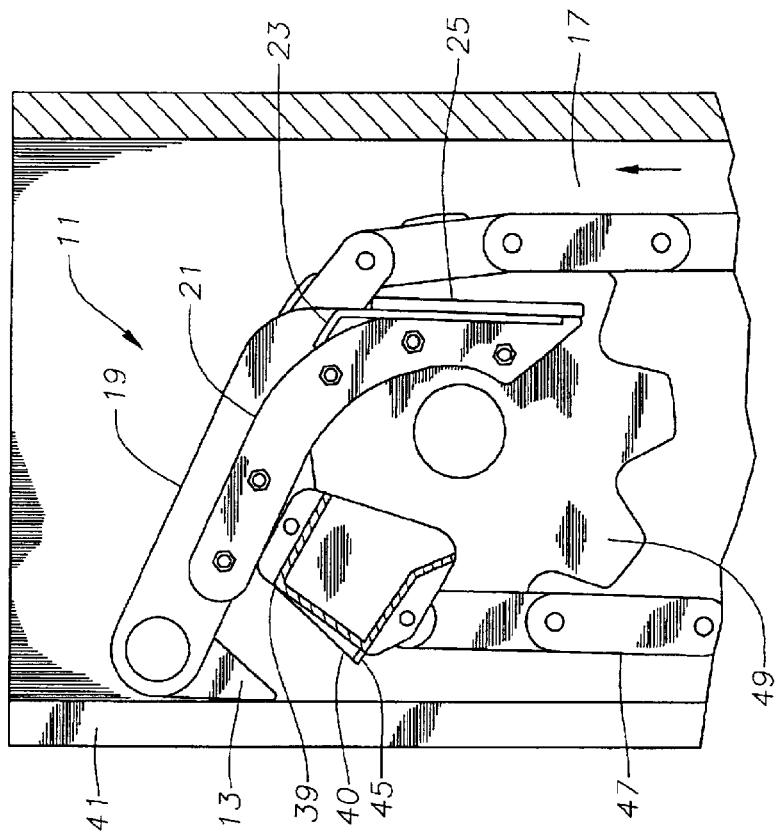
FIG. 6 is a sectional view of the screen system as shown in FIG. 5, but as the rake is clearing the scraper blade, in accordance with the present invention.

In operation of the first embodiment, scraper 11 will retain the position of FIG. 7 due to gravity. Stop plate 13 will be in contact with a flange on the forward side of frame 29. When a rake 17 contacts the wear guides 21, as shown in FIG. 5, the entire scraper 10 rises jointly by rotating upwards around the shaft 15. FIGS. 5–7 illustrate the action of each scraper arm at various points in operation. FIG. 5 shows the wear plates 21 of scraper arm 11 when initially being contacted by the rake arm 17. The contact causes scraper 10 to rise. The elastomeric scraper blade 25 and wear guide 21 are then touched by two tines 45 on the rake 39, but rake 39 does not touch any metal components on the scraper arm, particularly the base arm 19. The curvature in the front edges 22 of wear guides 21 prevent the metal tines 45 (FIG. 1) in the rake 39 from contacting the base arms 19 or wear guides 21 and being worn down since the physical contact between the metal tines 45 and the metal base arm 10 is nonexistent. Scraper blade 25 scrapes debris off of the rake tines 45. FIG. 6 demonstrates the rake arm 17 clearing the scraper arm 11. Finally, FIG. 7 shows the scraper arm 11 returning back to its normal position once the rake bar 17 has cleared the scraper arm 11 and is held in place by the pivot stop 13, as previously described. Wing bars 40 are welded behind the two tines 45 that contact the wear guides 21 as the rake 39 passes the scraper blade 25.

Figure 8:
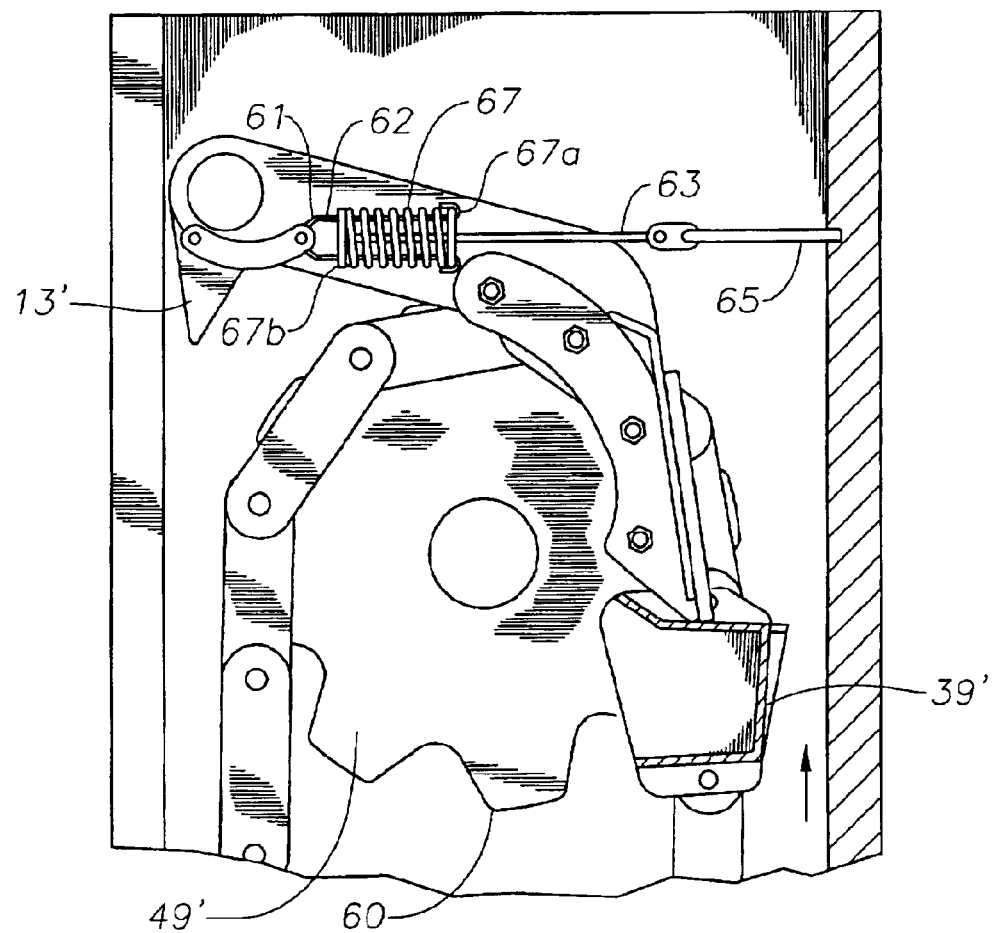
FIG. 8 is a side view of the screen system utilizing a spring to assist in raising the scraper in accordance with a second embodiment of the present invention.

As illustrated in FIG. 8 in a second embodiment of the present invention, a spring 67 can be used to assist in cushioning the return of scraper 10' to its rest position. The pivot point 60 for rakes 39' is shown at a higher elevation relative to sprocket 49' than in the first embodiment. Spring 67 is preferably attached at a first spring end 62 to pivot stop 13' by a pair of side link bars 61. Spring 67 is secured between the two side link bars 61, and the side link bars 61 are pivotally attached to pivot stop 13'. Spring 67 is preferably attached at a second spring end 63 to the screen frame 29' by a pair of spring draw bars 65 with spring 67 being secured between two spring draw bars 65. Spring 67 is of a type that further compresses when ends 62, 63 are pulled apart from each other. Spring end 62 is connected through a first frame member to a retainer plate 47a. Spring end 63 is connected through a second frame member to a retainer plate 65. The length of spring 67 is selected so that it is under compression while scraper 10' is in the lower position. When the scraper 10' raises due to contact with rake 39', the compression of spring 67 urges scraper 10' to move from its lower position shown in FIG. 8. The spring force alone, however, is not sufficient to overcome the weight of scraper arm 10' to cause it to move upward.

As scraper 10' raises, spring ends 62, 63 move toward each other, decreasing the compression. As scraper 10' begins to move back to the lower position, spring ends 62, 63 move apart, increasing the compression. Spring 67 tends to cushion the return of scraper 10' to the lower position. Because scraper 10' has to compress spring 67 when returning to the rest position, the rate of returning movement is slowed and the impact of pivot stop 13' is cushioned. In screen systems with a width of over four feet, more than one spring 67 can be used.

Figure 9:
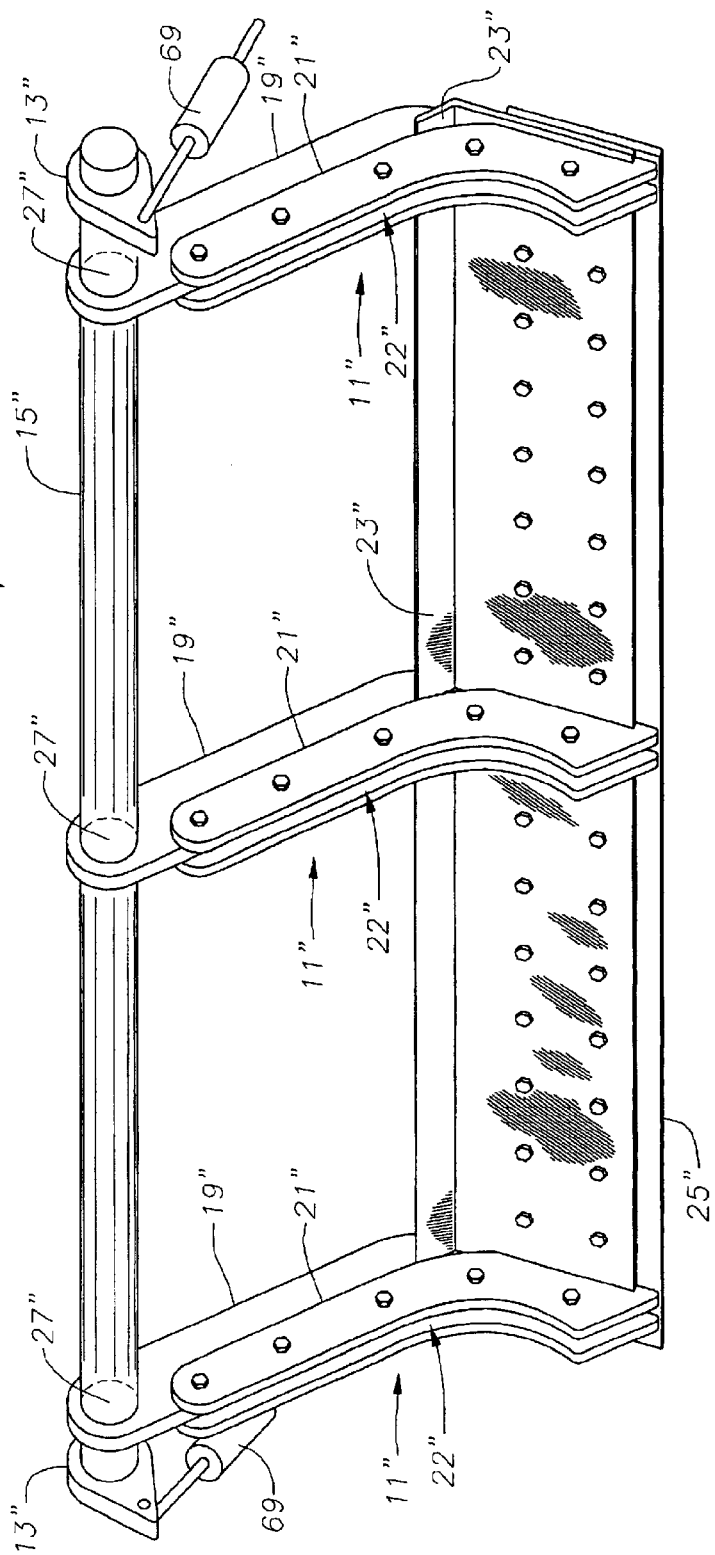
FIG. 9 is a side view of the screen system utilizing a shock absorber to assist in lowering the scraper in accordance with a third embodiment of the present invention.

In a third embodiment, which is shown in FIG. 9, the present invention can include a shock absorber 69 installed in conjunction with the pivot stop 13" to decrease the speed at which the scraper 10" returns to its original position. Shock absorber 69 can be any type of device that will allow the pivot stop 13" to rise freely and then return to its original place at a reduced speed. Devices suitable for such function will be known to those skilled in the art and are to be considered within the scope of the present invention. As the scraper 10" is raised, the pivot stop 13" rotates upwards from its original position. As the pivot stop 13" rotates up, shock absorber 69 allows pivot stop 13" to raise freely. Once the rake 39" clears the scraper 10", shock absorber 69 reduces the speed at which the pivot stop 13" returns to its original position. The shock absorber 69 can be used together with spring 67 (FIG. 8) in the same screen system.

The present invention has many advantages when compared to prior art systems. The first advantage is that the tines on the rake bars do not wear out as quickly since there is minimal contact with any of the tines. Since the tines do not wear out, the need to replace the rakes is significantly reduced. The spring and shock absorber embodiments further decrease wear on the scraper plate by cushioning the return of the scraper plate to its lower position.

While the invention has been shown or described in only some of its forms, it should be apparent to those skilled in the art that it is not so limited, but is susceptible to various changes without departing from the scope of the invention.

What is claimed is:

1. A screen system for removing debris from a flow channel, the system comprising:

a screen frame;

a plurality of bars, defining a bar screenfield;

a rake having a plurality of tines that fit between the bars of the bar screenfield, the rake being movable along the bars to clear the bar screenfield of debris;

a scraper mounted horizontally at a top of the screen system for removing the debris from the rakes, the scraper having a blade that engages the rake as the rake move towards a top of the screen frame, the blade comprising a single piece rigid member, the scraper being pivotally mounted to the screen frame for movement between a rest position while not engaging the rake and engaged position when engaging the rake; and the scraper including a plurality of horizontally spaced apart scraper arms that rigidly support the blade, at least one of the arms having a curved inner edge under which the rake passes, the curved inner edge having a curvature to prevent contact of the curved inner edge with the tines of the rake.

2. The screen system as defined in claim 1, further comprising a spring connected to the screen frame on a first end and carried by one of the scraper arms for slowing the movement of the scraper from the engaged position to the rest position.

3. The screen system as defined in claim 1, further comprising a cushioning device mounted between the scraper and the screen frame to reduce a rate at which the scraper is returned to the rest position once the rake clears the scraper.

4. The screen system as defined in claim 1, further comprising a spring mounted between the scraper and the frame, the spring being under compression while the scraper is in the rest position for urging the scraper toward the engaged position.

5. The screen system as defined in claim 1, further comprising a shock absorber mounted between the scraper and the frame to reduce a rate at which the scraper is returned to the rest position once the rake clears the scraper.

6. The screen system as defined in claim 1, further comprising a plurality of wing members mounted to trailing edges of the tines of the rake, the wing members being spaced horizontally apart from each other for aligning with the scraper arms, each wing member being a ramp surface that guides the scraper over the rake in the event the direction of the movement of the rake is reversed.

7. The screen system as defined in claim 1, wherein a leading edge and the curved inner edge of each of the scraper arms are formed of a plastic material.

8. The screen system as defined in claim 1, further comprising a stop member mounted to the scraper arm for movement therewith, the stop member contacting a portion of the screen frame while the scraper is in the rest position.

9. The screen system as defined in claim 1, wherein the blade is position for contact with the rake, and the curved inner edge is located inward from the blade.

10. A screen system for removing debris from a flow channel, the system comprising:

a screen frame;

a plurality of bars, defining a bar screenfield;

a rake having a plurality of tines that fit between the bars of the bar screenfield, the rake being movable along the bars to clear the bar screenfield of debris;

a scraper mounted horizontally at a top of the screen system for removing the debris from the rakes, the scraper having a blade that emerges the rake as the rake move towards a top of the screen frame, the scanner being pivotally mounted to the screen frame for movement between a rest position while not engaging the rake and an engaged position when engaging the rake; and the scraper including a plurality of horizontally spaced apart scraper arms that support the blade, at least one of the arms having a curved inner edge under which the rake passes, the curved inner edge having a curvature to prevent contact of the curved inner edge with the tines of the rake, wherein each scraper arm comprises:

a metal base member; and a wear plate formed of plastic and mounted to at least one side of the metal base member; and wherein a leading edge and a curved inner edge are formed in the wear plate and extend forward of the metal base member.

11. A screen system for removing debris from a flow channel, the system comprising:

a screen frame;

a plurality of bars, defining a bar screenfield;

a rake having a plurality of tines that fit between the bars of the bar screenfield, the rake being movable along the bars to clear the bar screenfield of debris;

a scraper mounted horizontally at a top of the screen system for removing the debris from the rakes, the scraper having a blade the engages the rake as the rake move towards a top of the screen frame, the scraper being pivotally mounted to the screen frame for movement between a rest position while not engaging the rake and an engaged position when engaging the rake;

the scraper including a plurality of horizontally spaced apart scraper arms that support the blade, at least one of the arms having a curved inner edge under which the rake passes, the curved inner edge having a curvature to prevent contact of the curved inner edge with the tines of the rake; and the scraper further comprising a transition edge on the scraper arm leading from the scraper blade to the curved inner edge of the scraper arm, wherein the transition edge contacts tines of the rake after the tines have passed from the blade.

12. A screen system for removing debris from a flow channel, the system comprising:

a screen frame;

a plurality of bars defining a bar screenfield;

a rake having a plurality of tines that fit between the bar of the bar screenfield, the rake being movable along the bars to clear the bar screenfield of debris;

a scraper mounted horizontally at a top of the screen system for removing the debris from the rakes, the scraper having a blade that engages the rake as the rake move towards a top of the screen frame, the scraper being pivotally mounted to the screen frame for movement between a rest position while not engaging the rake and an engaged position when engaging the rake;

the scraper including a plurality of horizontally spaced apart scraper arms that support the blade, at lead one of the arms having a curved inner edge under which the rake passes, the curved inner edge having a curvature to prevent contact of the curved inner edge with the tines of the rake;

a stop member mounted to the scraper arm for movement therewith, the stop member contacting a portion of the screen frame while the scraper is in the rest position; and wherein each scraper arm comprises:
a base member; and
a wear plate formed of plastic and mounted to at least one side of the base member; and wherein
the curved inner edge of the arm is located on the wear plate and is forward of the base member.

13. The screen system a defined in claim 12, further comprising a cushioning device mounted between the scraper and the frame to reduce a rate at which the scraper is returned to the rest position once the rake cleans the scraper.

14. The screen system as defined in claim 12, further comprises a spring mounted between the scraper and the frame, the spring being under compression while the scraper is in the rest position for urging the scraper toward the engaged position.

15. The screen system as defined in claim 12, the scraper further comprising a transition edge on the scraper arm leading from the scraper blade to the curved inner edge of the scraper arm, wherein the transition edge contacts tines of the rake after the tines have passed from the blade.

16. A screen system for removing debris from a flow channel, the system comprising:

a screen frame;

a plurality of bars defining a bar screenfield;

a rake having a plurality of tines that fit between the bars of the bar screenfield, the rake being movable along the bars to clear the bar screenfield of debris;

a scraper mounted horizontally at a top of the screen system for removing the debris from the rakes, the scraper having a blade that engages the rake as the rake move toward a top of the screen frame, the scraper being pivotally mounted to the screen frame for movement being a rest position while not engaging the rake and an engaged position when engaging the rake;

the scraper including a plurality of horizontally spaced apart scraper arms that support the blade, at least one of the arm having a metal base member and a plastic wear plate mounted thereto, the wear plate having a transition edge extending from the blade and a curved inner edge that is contacted by a trailing portion of the rake, the curved inner edge having a curvature to prevent contact of the curved inner edge with tines of the rake;

a stop member mounted to the scraper arm for movement therewith, the stop member contacting a portion of the screen frame while the scraper is in the rest position; and a cushioning device mounted between the scraper and the frame to reduce a rate at which the scraper is returned to the rest position once the rake clears the scraper.

17. The screen system as defined in claim 16, wherein the cushioning device comprises a spring that is under compression while the scraper is in the rest position and which raises the scraper toward the engaged position.

18. The screen system as defined in claim 16, wherein the cushioning device comprises a shock absorber.

19. The screen system as defined in claim 16, further comprising a plurality of wing members mounted to trailing edges of th tines of the rake, the wing members being spaced horizontally apart from each other for aligning with the scraper arms, each wing member being a ramp surface that guides the over the rake in the event the direction of the movement of the rake is reversed.

* * * * *